United States Patent [19]

Decobert et al.

[11] Patent Number: 4,661,576

[45] Date of Patent: Apr. 28, 1987

[54] THERMOTROPIC POLYMERS WITH LATERAL CHAINS HAVING A CHIRAL STRUCTURE AND PROCESS AND THEIR MANUFACTURE

[75] Inventors: Guy Decobert, Orsay; Jean C. Dubois, St Remy les Chevreuses; Françoise Soyer, Villebon sur Yvette, all of France

[73] Assignee: Thomson-CSF, Paris, France

[21] Appl. No.: 796,737

[22] Filed: Nov. 12, 1985

[30] Foreign Application Priority Data

Nov. 13, 1984 [FR] France .............................. 84 17292

[51] Int. Cl.$^4$ .......................................... C08F 212/24
[52] U.S. Cl. .................................... 526/298; 526/313
[58] Field of Search ................................ 526/313, 298

[56] References Cited

U.S. PATENT DOCUMENTS 4,281,152  7/1981  Huemmer et al. .................. 526/313
4,293,435  10/1981  Portugall et al. .................. 526/321

FOREIGN PATENT DOCUMENTS 0007574  7/1979  European Pat. Off. .
2722589  11/1978  Fed. Rep. of Germany .

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

The invention concerns a family of thermotropic polymers of the mesogenic the lateral group of which have at least one mesomorphous phase and obtained from a monomer having the general formula:

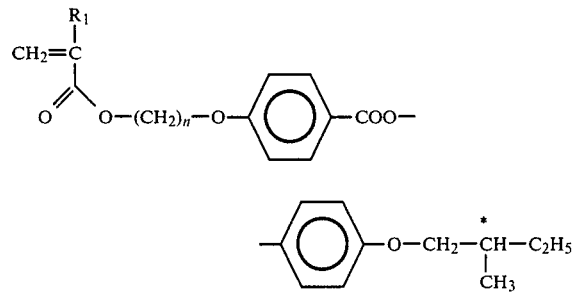

in which $R_1 = CH_3$, Cl or H and $2 \leq n \leq 11$.

2 Claims, 3 Drawing Figures

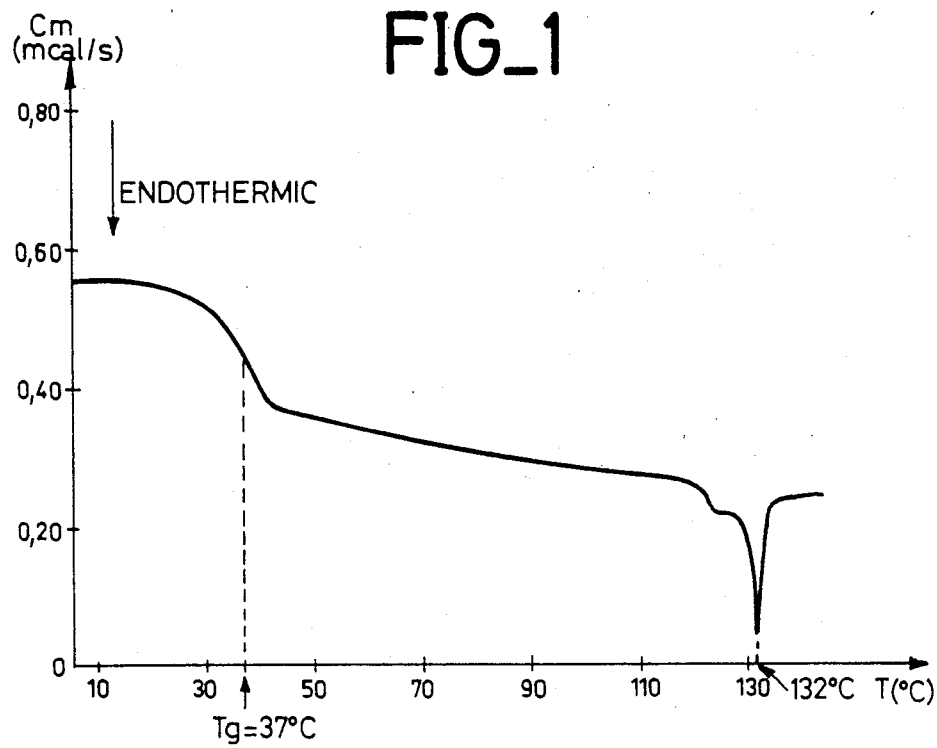
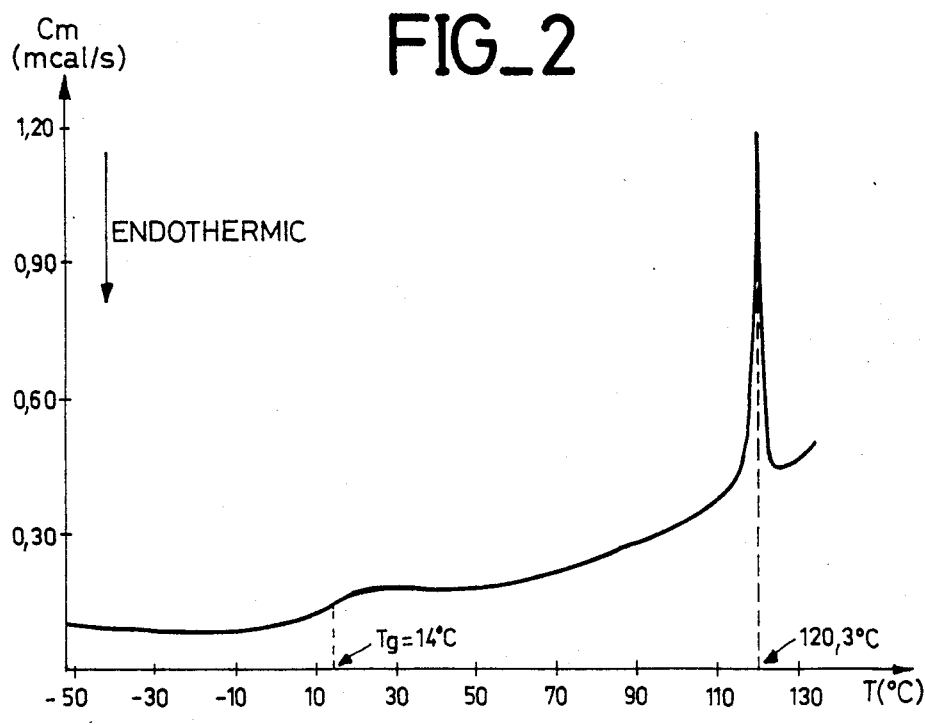

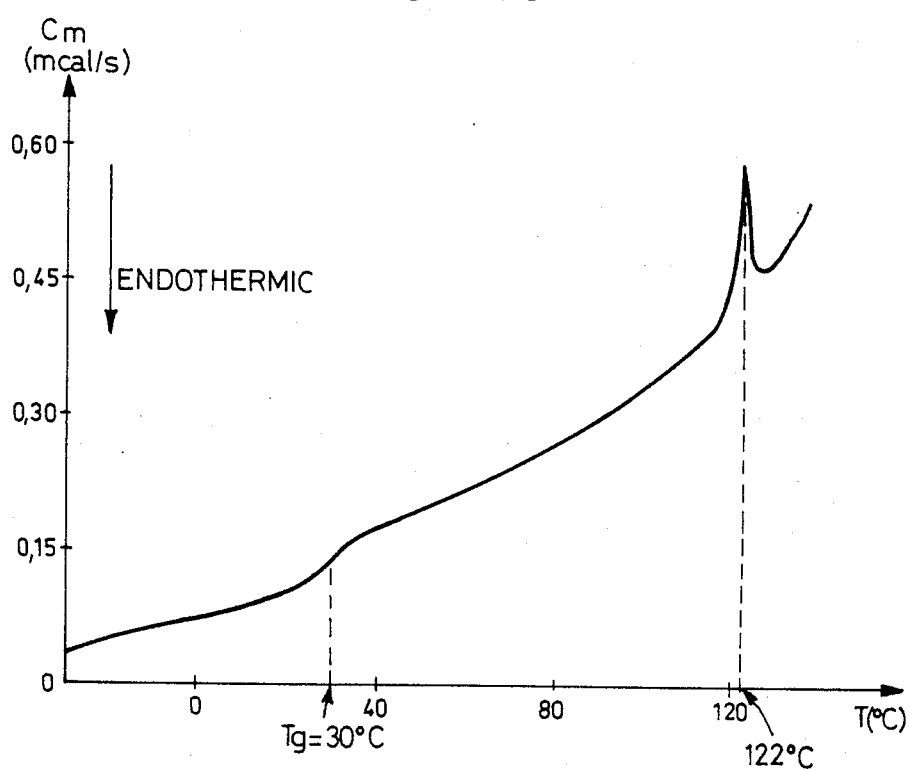
FIG_3

THERMOTROPIC POLYMERS WITH LATERAL CHAINS HAVING A CHIRAL STRUCTURE AND PROCESS AND THEIR MANUFACTURE

BACKGROUND OF THE INVENTION

1. Field of the invention

The present invention concerns a novel family of thermotropic polymers the lateral chains of which have a chiral structure. The family of compounds according to the invention is formed from a monomer having the general chemical formula:

$$CH_2=C(R_1)-COO-(CH_2)_n-OR_2$$

in which:
- $R_1$ is the methyl radical or an hydrogen or chlorine atom,
- n is an integer comprised between 2 and 11; and
- $R_2$ is the group

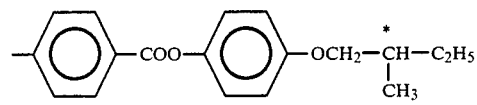

The invention also concerns the process for manufacturing molecules of this family.

2. Description of the prior art

After the extraordinary development of research upon liquid crystals over the past fifteen years, due mainly to their potential practical utilization (their simplicity in ease of use low control tensions, low consumption) many research teams have directed their efforts towards research on mesomorphous polymers. Thermotropic mesomorphous polymers are macromolecules presenting, over a certain range of temperatures often relatively high, anisotropic phases called smectic or nematic phases. They comprise one class of polymers with mesogenic lateral groups and another class where the mesogenic group is comprised within the chain. The present invention concerns a family of polymers belonging to the first class specified above.

Although liquid crystals of low molecular weight crystallize at low temperature, the majority of thermotropic polymers with lateral chains are amorphous and are characterized by their vitreous transition temperature Tg. Both the macroscopic texture and the mesophasic range parameter can be frozen in the vitreous state.

Thereby, it is possible to obtain films having anisotropic optical properties that can be utilized in devices of the non-linear optical field.

Furthermore, the study of cholesteric phases allow to envisage the preparation of filters, reflectors and force measuring apparatus. In fact, it is possible to obtain, among others, through the intermediary of materials according to the invention, cholesteric thermotropic polymers. Furthermore, since the threshold tension values and the time intervals required for the orientation of the mesophases placed within an electrical field are of the same dimensions as those of the liquid crystals of low molecular weight, it is possible to consider that these polymers could be utilized in visualization devices intended for data memory storage.

SUMMARY OF THE INVENTION

The aim of the present invention is therefore a thermotropic polymer of the mesogenic lateral group type, presenting at least one mesomorphous phase, said polymer being obtained through polymerization of at least one monomer $M_1$ having the general chemical formula:

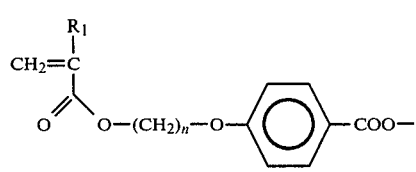
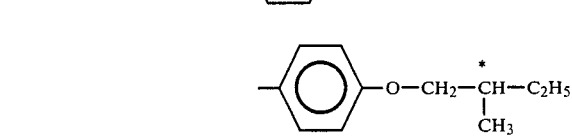

in which: $R_1=CH_3$, Cl or H and $2 \leq n \leq 11$.

Another aim of the present invention is a process for manufacturing such an organic compound, comprising the following steps:
- first step: synthesis of 2-methyl-1-bromobutane through the action of phosphorous tribromide upon 2-methyl-1-butanol;
- second step: synthesis of 4(3-methylbutyloxyphenol) through reaction of the 2-methyl-1-bromobutane obtained in the first step on hydroquinone;
- third step: synthesis of para-hydroxy-methyl-benzoic acid salt through esterification of 4-hydroxy-benzoic acid;
- fourth step: synthesis of para(hydroxyalkyloxy)-methyl-benzoic acid salt through reaction of w-bromoalcanol upon the parahydroxy-methyl-benzoic acid salt obtained in the third step:
- fifth step: synthesis of para(hydroxyalkyloxy)-benzoic acid through saponification of the ester obtained in the fourth step;
- sixth step: synthesis of 4(methacrylyloxy)alkoxy-benzoic acid, of 4(acrylyloxy)alkyloxy-benzoic acid or of 4(α-chloroacrylyloxy)alkoyloxy-benzoic acid through azeotropic esterification of the acid obtained in the fifth step with the methacrylic, acrylic or α-chloroacrylic acid respectively;
- seventh step: chloruration of the acid obtained in the sixth step;
- eighth step: synthesis of the monomer $M_1$ through reaction of the acid chloride obtained in the seventh step and of the alkoxyphenol obtained in the second step; and
- ninth step: polymerization of the monomer $M_1$ alone or in the presence of at least one other monomer.

BRIEF DESCRIPTION OF THE DRAWINGS

The invention will become more apparent and other features, objects and advantages will appear by means of the following description given with reference to the appended drawings among which:

FIG. 1 is a differential enthalpic analysis diagram of a thermotropic polymer according to the prior art;

FIGS. 2 and 3 are differential enthalpic analysis diagrams of thermotropic copolymers according to the invention.

DESCRIPTION OF THE PREFERRED EMBODIMENTS

The following description concerns the general synthesis process of molecules according to the invention as well as the mesomorphous properties of the corresponding thermotropic polymers. Furthermore, potential application examples will also be given.

GENERAL SYNTHESIS PROCESS

The compounds according to the invention are obtained in nine steps from the following commercially available products: 2-methyl-1-butanol, 4-hydroxy-benzoic acid and a ω-bromoalcanol.

Reaction 1: obtention of 2-methyl-1-bromobutane

This bromated derivate is obtained through the reaction of phosphor tribromide with 2-methyl-1-butanol in the presence of pyridine at a temperature of 10° C.

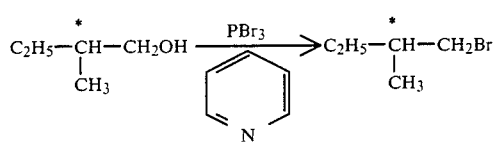

Reaction 2: obtention of 4(3-methylbutyloxyphenol)

4(3-methylbutyloxyphenol) is obtained through reaction of 2-methyl-1-bromobutane, obtained upon completion of reaction 1, with hydroquinone in the presence of a potassium hydroxide alcohol solution.

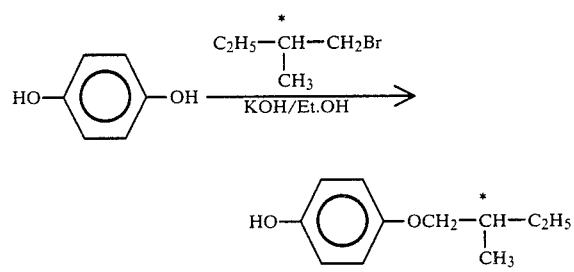

Reaction 3: obtention of para-hydroxy-methyl-benzoic acid salt

This derivate is obtained through the conventional esterification method of 4-hydroxy-benzoic acid described by RIEGEL, MOFFET and McINTOSH in Organic Syntheses, vol. 3, p. 327. The reaction is carried out through reaction of acetyl chloride in the presence of methanol.

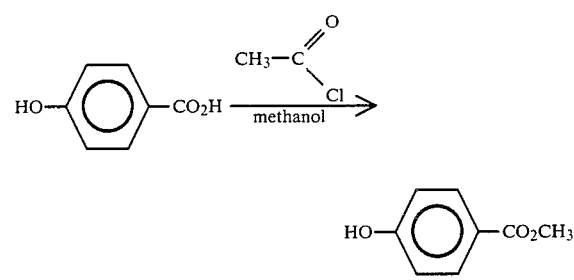

Reaction 4: preparation of para(hydroxyalkyloxy)methyl-benzoic acid salt

This derivate is obtained through reaction of ω-bromoalcanol upon the parahydroxy-methyl-benzoic acid salt obtained upon completion of reaction 3, in the presence of a potassium hydroxide alcohol solution.

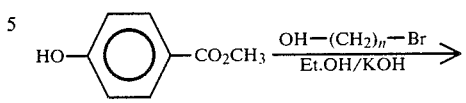

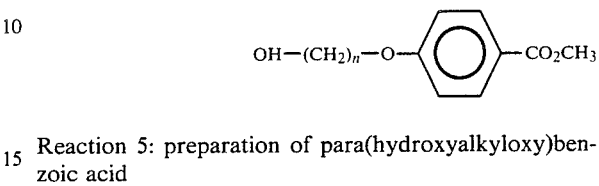

Reaction 5: preparation of para(hydroxyalkyloxy)benzoic acid

This acid is obtained through the saponification of the ester obtained upon the completion of reaction 4 according to the scheme:

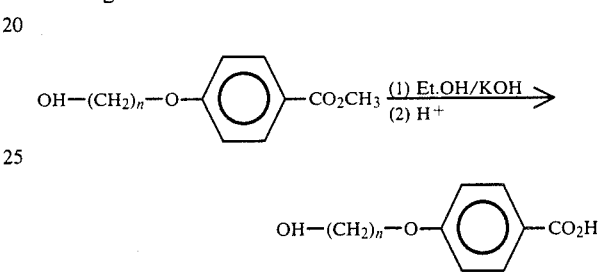

Reaction 6: preparation of 4(methacrylyloxy)alkyloxy benzoic acid, 4(acrylyloxy)alkyloxy benzoic acid or 4(α-chloroacrylyloxy)alkyloxy benzoic acid.

The acid obtained upon completion of reaction 5 undergoes an azeotropic esterification in a Dean-Stark type device (which allows the water to be progressively eliminated as it appears during the reaction) with methacrylic, acrylic or α-chloroacrylic acid in the presence of p-toluene sulfonic acid (called APTS).

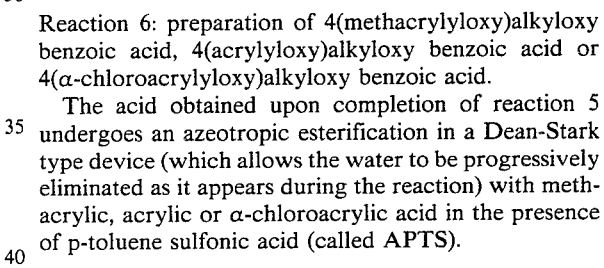

Reaction 7: the obtention of the chloric acid corresponding to the acid obtained by reaction 6 through reaction with thionyl chloride at ambient temperature in the presence of 2,6-diterbutylphenol.

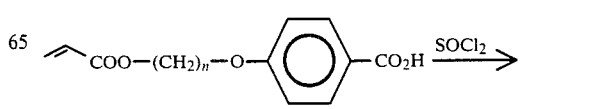

-continued

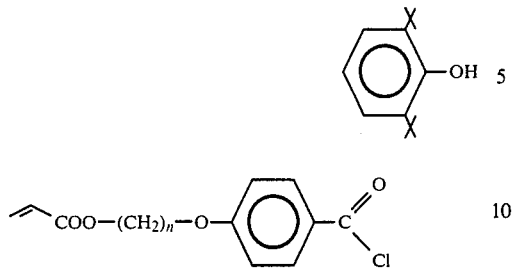

The reaction is identical for the obtention of 4(methacrylyloxy)alkyloxy benzoic acid chloride or of 4(α-chloroacrylyloxy)alkyloxy benzoic acid chloride.

Reaction 8: obtention of the monomer

The 4'(3-methylbutyloxy)pheyl-4(methacrylyloxyalkyloxy)-benzoic acid salt is produced from the corresponding acid chloride obtained upon completion of reaction 7 and of the alkyloxphenol obtained through reaction 2. The reaction is carried out at ambient temperature in the presence of triethylamine in tetrahydrofurane (THF).

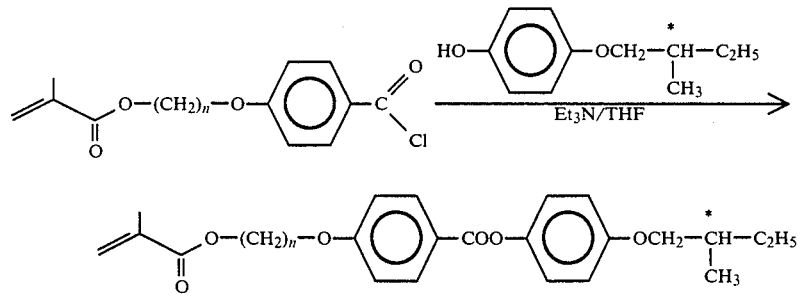

The acrylic and α-chloroacrylic monomers are obtained in the same way as the methacrylic monomer.

Reaction 9: elaboration of the polymer

The polymerization is carried out utilizing the monomer obtained in reaction 8 in the presence of AIBN (2-2'-azoisobutyronitrile) in toluene over a period of about ten hours, at 60° C. in a sealed tube.

OPERATING METHODS

The following part of the description will deal with several specific operational methods of the general synthesis process, the other steps belonging to the prior art field.

Reaction 2: synthesis of 4(3-methylbutyloxyphenol)

In a 250 ml capacity Erlenmeyer, provided with a reflux cooler and a dropping funnel, 30.8 g of hydroquinone (or 0.28 mole) and 50 ml of ethanol are introduced. The device is slightly heated in order to cause the hydroquinone to dissolve. Thereafter, drop by drop, 43 g (0.28 mole) of 2-methyl-1-bromobutane are added and the mixture is brought to reflux. The potassium hydroxide in aqueous solution (16.6 g in 50 cc water) is then added and the solution is maintained at reflux for 3 hours. At this step, the solution presents a reddish-brown color. It is acidified by a 5N hydrochloric acid solution and a hexane extraction is carried out. The organic phase is washed with water until neutrality, dried upon magnesium sulfate and evaporated in a rotary evaporator. The raw product crystallizes at −18° C. and by adding a small amount of petroleum ether, a light beige colored solid is obtained whose melting point in about 33° C. The yield of the reaction is about 35%.

Reaction 3: synthesis of para-hydroxy-methyl-benzoic acid salt.

50 g (0.36 mole) of hydroxy-benzoic acid are dissolved in methanol in a 1 liter capacity Erlenmeyer. The mixture is cooled to a temperature of about 5° C. Thereafter, 70 ml (1 mole) of acetyl chlorine are added drop by drop and the mixture is left to return to ambient temperature. A magnetic stirring is carried out over a period of about ten hours. The methanol is then flushed out under vacuum, in the same way as the hydrochloric acid that is formed and the remaining acetyl chloride. 55 g of a solid brown product are recovered. At this step, the yield of the reaction is 99%. A recrystallization in ethanol produces 37 g of pure product, the melting point of which is 123° C. The overall yield of the reaction is 67%.

Reaction 6: synthesis of 4(meta,α-chloro or acrylyloxy)alkyloxy benzoic acid.

The following are introduced into a 100 ml capacity Erlenmeyer fitted with a Dean-Stark type device. 10 g (0.032 mole) of 4(hydroxyalkyloxy)benzoic acid, 1.7 g of monohydrated para-toluene sulfonic acid, 0.6 g of hydroquinone, 19.2 g (0.22 mole) of distilled methacrylic acid and 50 ml benzene. The mixture is brought to reflux for 17 hours. Once cold, 100 ml of ether are added. An organic solution is obtained which is washed with water several times, dried upon magnesium sulfate and evaporated to one-quart of its volume. The solid which is obtained is filtered and washed with ether. The raw product is recrystallized twice in ethanol. The yield of the reaction is 35%.

It is the methacrylic compound that has been described hereinabove. The acrylic or α-chloroacrylic compound is obtained in the same way, provided that the molar proportions are respected.

The acids obtained upon completion of reaction 6 present liquid crystal properties. By way of example:

4(methacryloxy)undecanoxy benzoic acid having the formula:

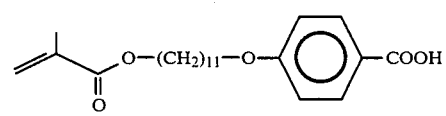

has a melting point of 108° C. when passing from the crystalline state to the isotropic state and pesents the following phase successions:
K 69° C. [N]99° C. I, K designating the crystalline phase, N a nematic phase and I the isotropic phase. The hooks designate a monotropic mesophase.

4(acrylyloxy)undecanoxy benzoic acid having the formula:

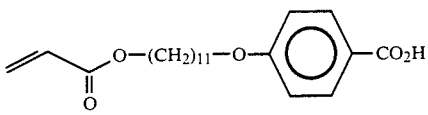

presents the following phase successions:
$K_1$ 97.7° C. $K_2$ 101° C. N 111° C. I
$K_1$ and $K_2$ each being a particular crystalline phase.

Reaction 7: obtention of acid chlorides. The obtention of the acrylic derivative will now be described. The methacrylic and α-chloroacrylic derivatives are obtained in the same way, provided that the molar proportions are respected.

A 50 liter capacity Erlenmeyer is loaded with 4.1 g (0.011 mole) of 4(acrylyloxy)undecanoxy benzoic acid, 10 ml of distilled thionyl chloride, a drop of dimethylformamide then a spatula of 2.6 diterbutylparaphenol. The mixture is stirred for 20 minutes at ambient temperature. The remaining thionyl chloride is evacuated under high vacuum and 10 ml of tetrahydrofurane are added. A solution $S_1$ is obtained.

Reaction 8: monomer synthesis

Into an Erlenmeyer are successively loaded: 0.97 g (0.006 mole) of 4(3-methylbutyloxyphenol) obtained upon completion of reaction 2, then 2 ml of triethylamine and 9 ml of tetrahydrofurane. A solution $S_2$ is obtained. To this solution is added the solution $S_1$ of the previous reaction and the mixture obtained is maintained under stirring for about ten hours at ambient temperature. The raw product obtained is chromatographed on the silica with an ethyl acetate/hexane mixture (in a quantity of 1 volume of acetate for 4 volumes of hexane) as eluent, 300 mg of pure monomer are recovered.

The overall yield of reactions 7 and 8 is 25%.

Reaction 9: synthesis of the polymer

The monomer obtained in reaction 8 is introduced into a glass phial. Then 1% by mole of 2-2'-azoisobutyronitrile and toluene are added to the monomer. The phial is then adapted to a ramp connected to a vacuum pump. Four freezing-defreezing cycles under high vacuum ($10^{-3}$ mecury) are then carried out. The phial is thereafter sealed under vacuum and heated to 60° C. for 6 hours. The phial is opened and the content poured into 800 ml of ethanol. The formed polymer precipitates. The yield of the reaction is about 70%.

The polymers obtained have the following denominations:
poly(4',3-methylbutyloxyphenyl-4-methacrylyloxyethyloxy-benzoic acid salt)
poly(4',3-methylbutyloxyphenyl-4-methacrylyloxypropyloxy-benzoic acid salt)
poly(4',3-methylbutyloxyphenyl-4-methacrylyloxybutyloxy-benzoic acid salt)
poly(4',3-methylbutyloxyphenyl-4-methacrylyloxypentyloxy-benzoic acid salt)
poly(4',3-methylbutyloxyphenyl-4-methacryloxyhecyloxy-benzoic acid salt)
poly(4',3-methylbutyloxyphenyl-4-methacrylyloxyheptyloxy-benzoic acid salt)
poly(4',3-methylbutyloxyphenyl-4-methacrylyloxyoctyloxy-benzoic acid salt)
poly(4',3-methylbutyloxyphenyl-4-methacrylyloxynonyloxy-benzoic acid salt)
poly(4',3-methylbutyloxyphenyl-4-methacrylyloxydecyloxy-benzoic acid salt)
poly(4',3-methylbutyloxyphenyl-4-methacrylyloxyundecyloxy-benzoic acid salt)
poly(4',3-methylbutyloxyphenyl-4-acrylyloxyethyloxy-benzoic acid salt)
poly(4',3-methylbutyloxyphenyl-4-acrylyloxypropyloxy-benzoic acid salt)
poly(4',3-methylbutyloxyphenyl-4-acrylyloxybutyloxy-benzoic acid salt)
poly(4',3-methylbutyloxyphenyl-4-acrylyloxypentyloxy-benzoic acid salt)
poly(4',3-methylbutyloxyphenyl-4-acrylyloxyhexyloxy-benzoic acid salt)
poly(4',3-methylbutyloxyphenyl-4-acrylyloxyheptyloxy-benzoic acid salt)
poly(4',3-methylbutyloxyphenyl-4-acrylyloxyoctyloxy-benzoic acid salt)
poly(4',3-methylbutyloxyphenyl-4-acryloyloxynonyloxy-benzoic acid salt)
poly(4',3-methylbutyloxyphenyl-4-acrylyloxydecyloxy-benzoic acid salt)
poly(4',3-methylbutyloxyphenyl-4-acrylyloxyundecyloxy-benzoic acid salt)
poly(4',3-methylbutyloxyphenyl-4-α-chloroacrylyloxyethyloxy-benzoic acid salt)
poly(4',3-methylbutyloxyphenyl-4-α-chloroacrylyloxypropyloxy-benzoic acid salt)
poly(4',3-methylbutyloxyphenyl-4-α-chloroacrylyloxybutyloxy-benzoic acid salt)
poly(4',3-methylbutyloxyphenyl-4-α-chloroacrylyloxypentyloxy-benzoic acid salt)
poly(4',3-methylbutyloxyphenyl-4-α-chloroacrylyloxyhexyloxy-benzoic acid salt)
poly(4',3-methylbutyloxyphenyl-4-α-chloroacrylyloxyheptyloxy-benzoic acid salt)
poly(4',3-methylbutyloxyphenyl-4-α-chloroacrylyloxyoctyloxy-benzoic acid salt)
poly(4',3-methylbutyloxyphenyl-4-α-chloroacrylyloxynonyloxy-benzoic acid salt)
poly(4',3-methylbutyloxyphenyl-4-α-chloroacrylyloxydecyloxy-benzoic acid salt)
poly(4',3-methylbutyloxyphenyl-4-α-chloroacrylyloxyundecyloxy-benzoic acid salt)

PROPERTIES OF SYNTHESIZED BODIES

The thermograms obtained by differential heat analysis can be described in the following way: at high temperature an exotherm characterizes the transition of the first isotrope-mesophase liquid order due to the lateral chains whereas at low temperature a vitreous transition (Tg) is observed. This is characteristic of the main polymer chain. Polarizing microscopic analyses show that the texture of the mesophase can be "frozen" without there being any change in the vitreous state. The vitreous state of the synthetized polymers cannot be discerned in differential enthalpic analysis. It is possible to have an indication of its order of dimension through the intermediary of copolymers the vitreous transition of which is visible.

By way of non-limitative example, the following phase diagrams represent two monomers according to the invention corresponding to n=11.

The methacrylic type has the following chemical formula:

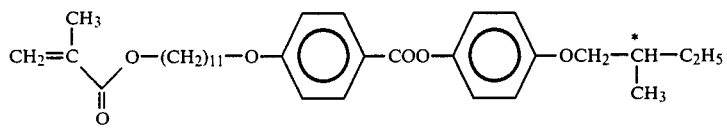

Its phase diagram is:

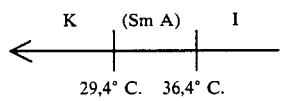

The expression (Sm A) indicates a monotropic smectic phase A. The acrylic derivative has the following chemical formula:

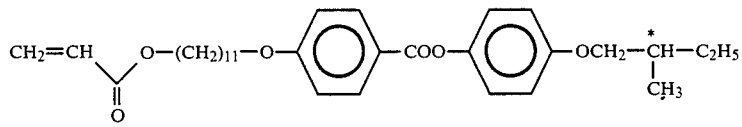

Its phase diagram is:

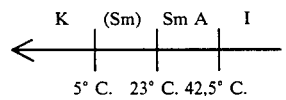

Sm A designates a smectic phase A. The mesophase (Sm) extending from 5° C. to 23° C. is monotropic and has the properties of an ordinated and tilted smectic phase.

The polymers formed from the monomers according to the invention have the following general chemical formula:

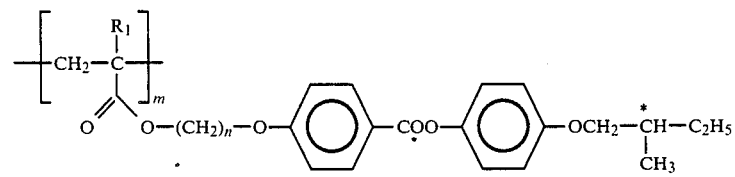

m designating the polymerization degree,
$R_1$ being the methyl radical or the chlorine or hydrogen atom.

The properties of these polymers are resumed in table 1 given at the end of the present description. Table 1 compiles five polymer examples.

for $R_1$=$CH_3$ with n=2 (compound I) or n=11 (compound II)

for $R_1$=H with n=2 (compound III) or n=11 (compound IV)

and for $R_1$=Cl with n=6 (compound V).

Obtained polymers I and V both have a smectic mesophase $M_2$ and another phase at lower temperature $M_1$. The vitreous transition temperature Tg has been theoretically calculated from copolymers. It has not been possible to calculate this temperature for all the compounds. ΔH represents the enthalpy transition in cal/g. Table 1 also compiles the phase transition temperatures $M_1$ to $M_2$ ($T_{M1/M2}$) and $M_2$ to the isotrope ($T_{M2/I}$).

It could be imagined that the chiral mesogeneous groups allow the obtention of cholesteric phases. In fact, the homopolymers prepared with such monomers only have smectic phases. It is nevertheless possible to prepare through copolymerization macromolecular compounds leading through heating to cholesteric melted masses. It is in fact possible to induce a sufficient distortion of the smectic structure through selecting, for example, as comonomers a chiral substance and a known compound that lead to the obtention of a polymer having a nematic phase. This polymer can be the following:

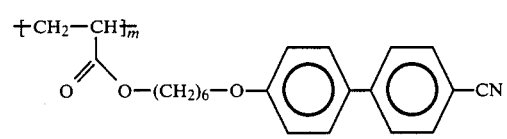

which has the following thermogram:

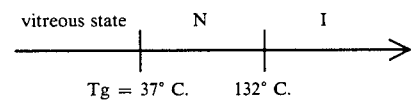

It has the differential enthalpic analysis diagram such as illustrated in FIG. 1. The axis of the ordinates of this diagram represent the heat pertaining to the mass Cm in mcal/s and the axis of the abscissae the temperature T in °C. This diagram allows to determine the vitreous transition Tg temperature and the transition temperature from the nematic phase to the isotropic phase. It has been traced through observation of the heating of the crystallized product up to its melting. The nematic phase of this polymer extends on 95° C.

From this compound and a compound according to the invention, it is possible to elaborate copolymers having the general chemical formula:

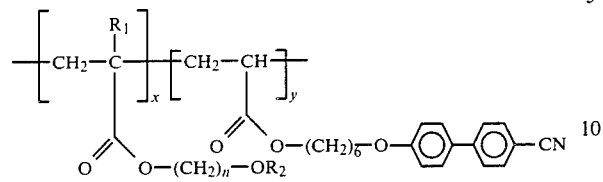

with:

$R_1 = CH_3$, Cl or H; and

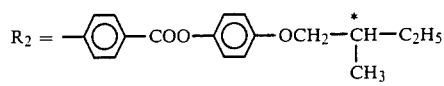

x and y being proportionality coefficients such that $x+y=1$.

Table 2, given at the end of the description, resumes the properties of such a copolymer. It comprises copolymers designated under the references VI and VII for which $R_1 = CH_3$ and $n=11$. According to this table, it will be noted that the nature of the mesophase evolves according to the proportions of the constituents of the copolymer. The mesophase of copolymer VI ($x=y=0.5$) is smectic while that of copolymer VII ($x=0.05$, $y=0.95$) is cholesteric. The transition temperatures Tg and $T_{M/I}$ have been determined according to the differential enthalpic analysis diagrams. FIGS. 2 and 3 represent such diagrams, respectively for the copolymers bearing the references VI and VII and studied herein-above. The axis of the ordinates of these diagrams represents the heat pertaining to the mass Cm in millicalories per second (mcal/s) and the axis of the abscissae the temperature T in °C. In these diagrams, the transition temperatures from the isotropic phase to the mesomorphic phase can be particularly well observed. When the coefficient x in the copolymer is too high, it is the smectic order that is determinent ($\Delta H_{S/I} \sim 2.3$ cal/g). On the other hand, when the rate of the chiral monomer decreases, the cholesteric mesophase appears ($\Delta H_{N/I} \sim 0.6$ cal/g). The diagrams of FIGS. 2 and 3 have been traced by observing the cooling of the melting products. For product VI, the transition of the mesophase to the isotrope phase is carried out at 125° C. and at cooling the transition occurs at 120.3° C. For product VII, these transitions occur respectively at 127° C. and 122° C.

Also comprised within the scope and spirit of the present invention is the object of producing copolymers of methacrylic, acrylic or α-chloroacrylic types. By way of non-limitative example, the following copolymer (reference VII) was synthetized:

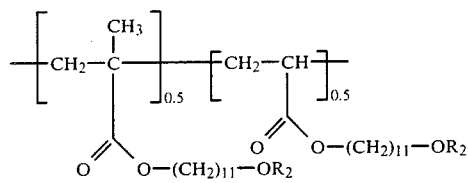

Table 3, at the end of the present description, resumes the main characteristics of this copolymer. Phase $M_1$ represents the vitreous state.

By means of these examples, the great potentiality of this novel family of thermotropic polymers presenting lateral chains with chiral structure has been set out. It is also possible thereafter to obtain films having anisotropic optical properties which could be applied within the non-linear optical field through addition of coloring agents or of molecules having both donor and electron acceptor groups. Furthermore, the possibility of obtaining through polymerization the cholesteric mesophase allows to envisage the preparation of filters, reflectors, force measuring apparatus, etc.

TABLE 1

| Ref | $R_1$ | n | $T_{M1/M2}$ | $T_{M2/I}$ | Tg | $\Delta H$ (cal/g) | Mesophase $M_2$ |
|---|---|---|---|---|---|---|---|
| I | $CH_3$ | 2 | 60° C. | 143.7° C. | — | $H_{M2/I} = 2.2$ | Smectic |
| II | $CH_3$ | 11 | 51° C. | 98.5° C. | −10° C. | $H_{M1/M2} \sim 2.3$ $H_{M2/I} \sim 3$ | Smectic |
| III | H | 2 | 100° C. | 134.7° C. | — | $H_{M2/I} = 1$ | Smectic |
| IV | H | 11 | 53.4° C. | 93.4° C. | — | $H_{M2/M1} = 2.9$ $H_{M2/I} = 3.3$ | Smectic |
| V | Cl | 6 | | 85.5° C. | 36.2° C. | $H_{M2/I} = 2.3$ | Smectic |

TABLE 2

| Ref | x | y | $T_{M/I}$ | Tg | $\Delta H$ | Mesophase M |
|---|---|---|---|---|---|---|
| VI | 0.5 | 0.5 | 125° C. | 14° C. | 2.3 cal/g | smectic |
| VII | 0.05 | 0.95 | 127° C. | 30° C. | 0.65 cal/g | cholesteric |

TABLE 3

| Ref | $T_{M1/M2}$ | $T_{M2/I}$ | $\Delta H$ (cal/g) | Mesophase $M_2$ |
|---|---|---|---|---|
| VIII | 46° C. | 101° C. | $H_{M2/I} = 3.07$ | smectic |

We claim:

1. A thermotropic polymer of the mesogenic lateral group type having at least one mesomorphous phase through copolymerization of a monomer $M_1$ of the formula:

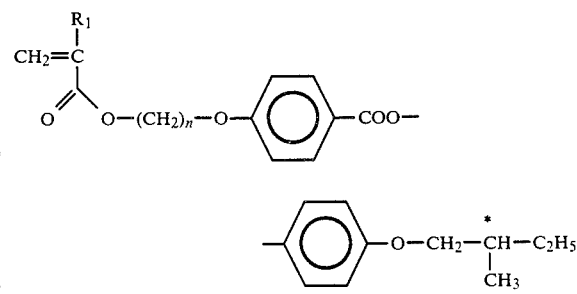

in which $R_1$ is $CH_3$ or H with $n=11$ or $R_1$ is Cl with $2 \leq n \leq 11$, with a second monomer $M_2$ of the formula:

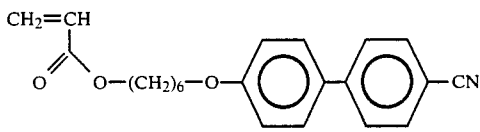

which provides a copolymer product having at least one nematic phase with the proportion of said monomers in the polymer being such that the existence of a cholesteric phase is allowed.

2. A thermotropic polymer according to claim 1, wherein:

in the said monomer $M_1$:$R_1=CH_3$ and $n=11$,
the said second monomer $M_2$ has the chemical formula

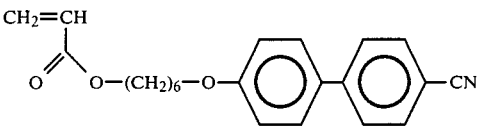

the proportions of the monomers $M_1$ and $M_2$ in the polymer being respectively 0.05 and 0.95.

* * * * *